US008928298B2

(12) United States Patent
Hsiao et al.

(10) Patent No.: US 8,928,298 B2
(45) Date of Patent: Jan. 6, 2015

(54) POWER SYSTEM AND POWER CONTROLLING METHOD AND APPARATUS THEREOF (75) Inventors: Chih-Hung Hsiao, Taoyuan Hsien (TW); Cheng-Chieh Chan, Taoyuan Hsien (TW); Ching-Yueh Yu, Taoyuan Hsien (TW); Yueh-Shan Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 174 days.

(21) Appl. No.: 13/351,240

(22) Filed: Jan. 17, 2012

(65) Prior Publication Data

US 2013/0088210 A1    Apr. 11, 2013

(30) Foreign Application Priority Data

Oct. 11, 2011   (TW) .............................. 100136666 A (51) Int. Cl.
G05F 1/56 (2006.01)
H02J 7/14 (2006.01)
H02M 3/158 (2006.01)
H02P 3/22 (2006.01)
H02J 7/00 (2006.01)

(52) U.S. Cl.
CPC ............ *H02J 7/1415* (2013.01); *H02J 7/1492* (2013.01); *H02M 3/1582* (2013.01); *H02P 3/22* (2013.01); *H02J 2007/0039* (2013.01)
USPC ....................................................... 323/282

(58) Field of Classification Search
USPC .................. 323/282–285, 301; 363/16–17, 363/131–132
See application file for complete search history.

(56) References Cited

U.S. PATENT DOCUMENTS

| 5,929,538 | A | * | 7/1999 | O'Sullivan et al. ............. 307/66 |
| 6,452,289 | B1 | * | 9/2002 | Lansberry et al. ............. 307/25 |
| 8,624,559 | B2 | * | 1/2014 | Syed et al. ..................... 320/162 |
| 2006/0012344 | A1 | * | 1/2006 | Velhner et al. .................. 322/23 |
| 2007/0223258 | A1 | * | 9/2007 | Lai et al. ......................... 363/37 |
| 2010/0025995 | A1 | * | 2/2010 | Lang et al. ....................... 290/44 |
| 2011/0026281 | A1 | * | 2/2011 | Chapman et al. ............... 363/65 |

FOREIGN PATENT DOCUMENTS

| CN | 101098079 A | 1/2008 |
| CN | 102130605 A | 7/2011 |
| CN | 102168652 A | 8/2011 |
| TW | 434995 B | 5/2001 |

* cited by examiner

*Primary Examiner* — Adolf Berhane
*Assistant Examiner* — Henry Lee, III
(74) *Attorney, Agent, or Firm* — CKC & Partners Co., Ltd.

(57) ABSTRACT

A power controlling method includes the following steps. A first Proportional Integral (PI) computation is performed according to an input current signal and command. Next, whether the input current signal is greater than a maximum rated charging current of a battery unit is determined to generate a switching signal for controlling a brake unit correspondingly. Then, a second PI computation is performed in accordance with the output voltage signal and a predetermined voltage command. Thereafter, the output voltage signal and the voltage command are compared to set an output current command selectively. Next, a third PI computation is performed in accordance with the output current signal and command to adjust a first pair of switching signals and a second pair of switching signals, such that a switching unit performs a corresponding switching action to adjust the output voltage signal. A power system and a power controlling apparatus are provide.

22 Claims, 10 Drawing Sheets

POWER SYSTEM AND POWER CONTROLLING METHOD AND APPARATUS THEREOF

RELATED APPLICATIONS

This application claims priority to Taiwan Application Serial Number 100136666, filed Oct. 11, 2011, which is herein incorporated by reference.

BACKGROUND

1. Technical Field

The present disclosure relates to a power system, and more particularly to a power controlling method and a power controlling apparatus of a power system.

2. Description of Related Art

In recent years, due to growing environmental awareness, technologies of renewable energy sources are developed rapidly. Among the renewable energy sources, wind power generation is a simple and zero-pollution power generation mode, which adopts a wind force generated by nature to drive blades of a wind turbine, so as to convert the external wind force as a power output for providing electric power to an element (for example, a battery).

However, when the external wind force is too large, a rotational speed of the blades of the wind turbine increases accordingly, and thus a charging current generated by the wind turbine is greater than a maximum rated current of a battery, which affects the service life of the battery. In addition, in a controlling circuit of a conventional wind power generation system, the rotational speed of the wind turbine may be affected by an output voltage of the battery, thus resulting in that the power generation efficiency of the whole power generation system fails to be increased, and that it takes a long period of time to achieve stability of input and output energies between the wind turbine and the battery.

Therefore, the prior art still has the aforementioned disadvantages and defects to be dealt with.

SUMMARY

An aspect of the present disclosure is to provide a power controlling apparatus, which includes an input end, an output end, a controlling unit, and a switching unit. The input end is used for receiving an input voltage signal and an input current signal corresponding to energy provided by a generator. The output end is used for transmitting an output voltage signal and an output current signal to a battery unit. The controlling unit is electrically coupled to the input end and the output end, and is used for generating a plurality of switching signals according to the input voltage signal, the input current signal, the output voltage signal, and the output current signal. One of the switching signals is used to turn on or turn off a brake unit coupled to the input end, so as to change the input current signal received by the input end. The switching unit is electrically coupled to the input end, the output end, and the controlling unit, and is controlled by at least one of the switching signals generated by the controlling unit to adjust the output voltage signal.

According to an embodiment of the present disclosure, the controlling unit includes a first comparison module and a first Proportional Integral (PI) controller. The first comparison module is used for comparing the input current signal with an input current command of a maximum power output corresponding to the input voltage signal, so as to output a first difference. The first PI controller is electrically coupled to the first comparison module, and is used for receiving the first difference and performing computation processing on the first difference by using a piecewise PI method, so as to generate a first PI output.

According to an embodiment of the present disclosure, the controlling unit further includes a first determination module. The first determination module is electrically coupled to the first PI controller, and is used for determining whether the input current signal is greater than a maximum rated charging current of the battery unit, so that the controlling unit generates the switching signal for controlling the brake unit according to a determination result of the first determination module.

According to an embodiment of the present disclosure, the controlling unit further includes a second comparison module and a second PI controller. The second comparison module is used for comparing the output voltage signal with a voltage command predetermined by the battery unit, so as to output a second difference. The second PI controller is electrically coupled to the second comparison module, and is used for receiving the second difference and performing computation processing on the second difference by using the piecewise PI method, so as to generate a second PI output.

According to an embodiment of the present disclosure, the controlling unit further includes a first selection module. The first selection module is electrically coupled to the first determination module and the second PI controller. The first selection module selectively sets an output current command to be the first PI output or the second PI output according to a comparison result of the output voltage signal and the voltage command.

According to an embodiment of the present disclosure, the controlling unit further includes a third comparison module, a third PI controller, and a second determination module. The third comparison module is used for comparing the output current signal with the output current command, so as to output a third difference. The third PI controller is electrically coupled to the third comparison module, and is used for receiving the third difference and performing computation processing on the third difference by using the piecewise PI method, so as to generate a third PI output. The second determination module is electrically coupled to the third PI controller, and is used for deciding according to the third PI output that the controlling unit outputs a first pair of switching signals and a second pair of switching signals among the switching signals. The controlling unit adjusts the first pair of switching signals and the second pair of switching signals according to the third PI output, thereby enabling the switching unit to perform a corresponding switching action, so as to adjust the output voltage signal.

According to an embodiment of the present disclosure, when the first selection module sets the output current command to be the first PI output, the power controlling apparatus charges the battery unit with the substantially constant output current signal; and when the first selection module sets the output current command to be the second PI output, the power controlling apparatus charges the battery unit with the substantially constant output voltage signal.

Another aspect of the present disclosure is to provide a power system, which includes a power input end, a power output end, a brake switch, a controlling unit, and a switching unit. The power input end is used for receiving an input voltage signal and an input current signal corresponding to energy provided by a generator. The power output end is used for transmitting an output voltage signal and an output current signal to a battery unit. The brake switch is electrically coupled to the power input end, and is used for adjusting the input current signal. The controlling unit is electrically coupled to the power input end and the power output end, and is used for generating a plurality of to switching signals according to the input voltage signal, the input current signal, the output voltage signal, and the output current signal, where one of the switching signals is used to turn on or turn off the brake unit, so as to change the input current signal received by the power input end. The switching unit is electrically coupled to the power input end, the power output end, and the controlling unit, and controlled by at least one of the switching signals generated by the controlling unit to adjust the output voltage signal.

According to an embodiment of the present disclosure, the controlling unit performs comparison and a piecewise PI computation on the input voltage signal, the input current signal, the output voltage signal, the output current signal, a voltage command, and a current command, so as to output the switching signals.

According to an embodiment of the present disclosure, the switching unit includes a first switch, a second switch, a third switch, a fourth switch, and an inductor. The first switch is electrically coupled to the controlling unit and the power input end. The second switch is electrically coupled to the controlling unit and the power output end. The third switch is electrically coupled to the controlling unit, the first switch, and a grounding end. The fourth switch is electrically coupled to the controlling unit, the second switch, and the grounding end. The inductor is electrically coupled between the first switch, the second switch, the third switch, and the fourth switch, where the first switch, the second switch, the third switch, the fourth switch, and the inductor form an H-shaped electrical bridge.

According to an embodiment of the present disclosure, the controlling unit controls on-time of the first switch and the third switch through a first pair of switching signals among the switching signals, so as to decrease the output voltage signal.

According to an embodiment of the present disclosure, the first pair of switching signals are complementary pulse width modulated signals.

According to an embodiment of the present disclosure, the controlling unit controls on-time of the second switch and the fourth switch through a second pair of switching signals among the switching signals, so as to increase the output voltage signal.

According to an embodiment of the present disclosure, the second pair of switching signals are complementary pulse width modulated signals.

According to an embodiment of the present disclosure, the controlling unit may further output another one of the switching signals, so as to turn on or turn off a load switch coupled to the power output end.

Another aspect of the present disclosure is to provide a power controlling method, which includes the following steps: performing a first PI computation according to an input current signal and an input current command of a maximum power output corresponding to an input voltage signal, where the input current signal and the input voltage signal are corresponding to energy provided by a generator; determining whether the input current signal is greater than a maximum rated charging current of a battery unit; generating a switching signal for controlling a brake unit when the input current signal is greater than the maximum rated charging current of the battery unit; performing a second PI computation according to an output voltage signal and a voltage command predetermined by the battery unit; comparing the output voltage signal with the voltage command; selectively setting an output current command to be a result of the first PI computation or a result of the second PI computation according to a comparison result of the output voltage signal and the voltage command; performing a third PI computation according to an output current signal and the output current command; and adjusting a first pair of switching signals and a second pair of switching signals according to a result of the third PI computation, thereby enabling a switching unit to perform a corresponding switching action, so as to adjust the output voltage signal.

According to an embodiment of the present disclosure, the first PI computation, in the second PI computation, and the third PI computation, each of an error gain function and an integral gain function is divided into a plurality of sections, and a controlling unit performs computation processing on gain values corresponding to the sections, and shortens computation processing time by operating with the piecewise PI method.

According to an embodiment of the present disclosure, the performing the first PI computation further includes the following steps: comparing the input current signal with the input current command of the maximum power output corresponding to the input voltage signal, so as to output a first difference; and performing computation processing on the first difference by using the piecewise PI method, so as to generate a first PI output.

According to an embodiment of the present disclosure, the performing the second PI computation further includes the following steps: comparing the output voltage signal with the voltage command predetermined by the battery unit, so as to output a second difference; and performing computation processing on the second difference by using the piecewise PI method, so as to generate a second PI output.

According to an embodiment of the present disclosure, the performing the third PI computation further includes the following steps: comparing the output current signal with the output current command, so as to output a third difference; and performing computation processing on the third difference by using the piecewise PI method, so as to generate a third PI output.

According to an embodiment of the present disclosure, when the output voltage signal is smaller than the voltage command, the output current command is set to be the result of the first PI computation, thereby enabling the battery unit to be charged with the substantially constant output current signal; and when the output voltage signal is equal to the voltage command, the output current command is set to be the result of the second PI computation, thereby enabling the battery unit to be charged with the substantially constant output voltage signal.

According to an embodiment of the present disclosure, the first pair of switching signals are complementary pulse width modulated signals, and the second pair of switching signals are complementary pulse width modulated signals.

According to an embodiment of the present disclosure, the power controlling method further includes: outputting another one of the switching signals to control a load unit to be turned on or turned off.

Therefore, by applying the power system, the power controlling apparatus, and the power controlling method according to the present disclosure, energy generated by a wind turbine can be distributed to the battery unit and the brake unit in a balanced manner, and a steady state can be reached rapidly between the wind turbine, the battery unit, and the brake unit.

BRIEF DESCRIPTION OF THE DRAWINGS

To make the aforementioned and other objectives, features, advantages, and embodiments of the present disclosure more comprehensible, the accompanying drawings are described below.

DETAILED DESCRIPTION

The spirit of the present disclosure is clearly illustrated below through drawings and detailed descriptions. Definitely, any person of ordinary skill in the art that understands preferred embodiments of the present disclosure may make modifications and improvements according to the techniques shown by the present disclosure, and the modifications and improvements do not depart from the spirit and scope of the present disclosure.

Normally, "about", "approximate", or "close to" used herein generally refers to that a deviation or scope of a value is within 20 percent, preferably within 10 percent, and more preferably within 5 percent. If not clearly specified, any involved value shall be regarded as an approximate value, that is, the deviation or scope indicated by "about", "approximate", or "close to".

Figure 1:
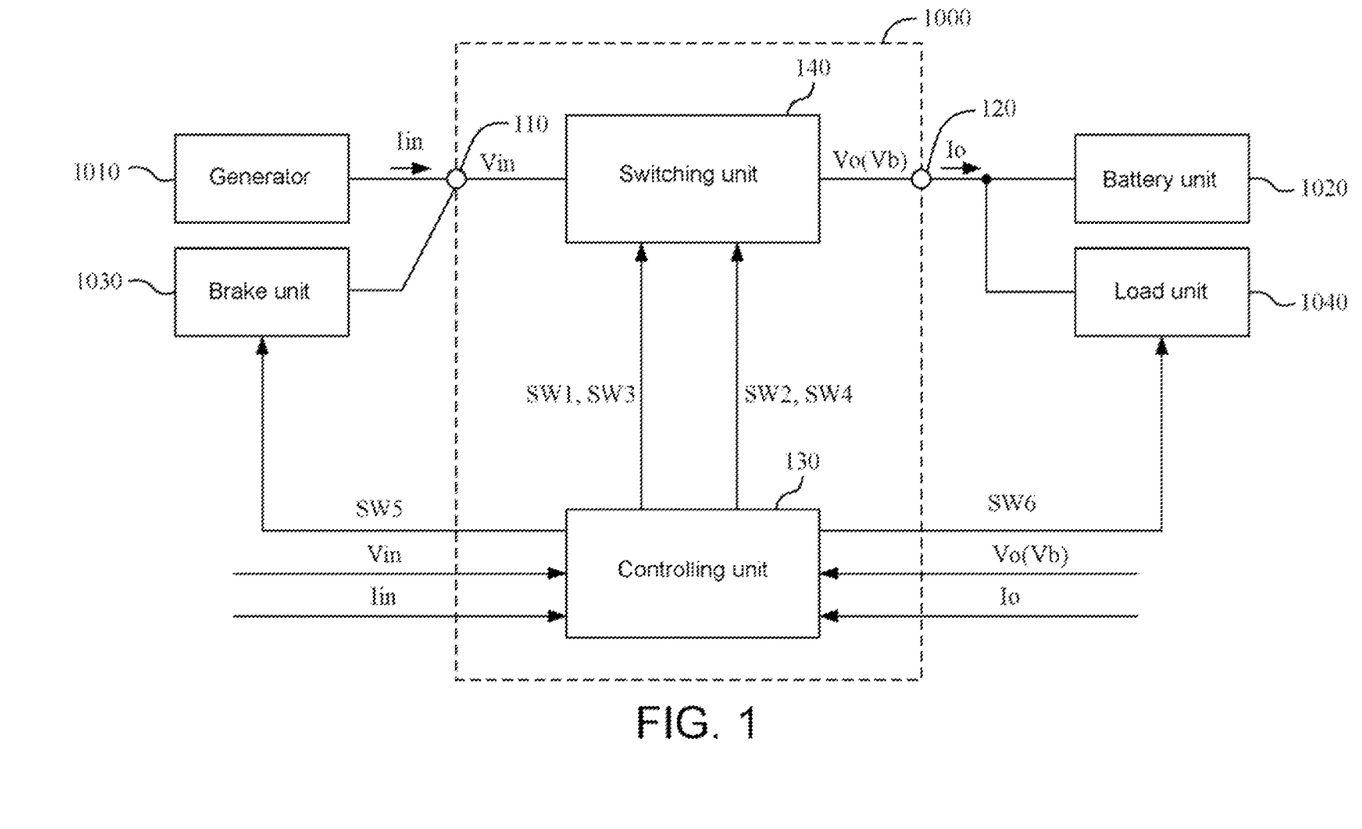
FIG. 1 is a schematic circuit block diagram of a power system according to an embodiment of the present disclosure.

Referring to FIG. 1, FIG. 1 is a schematic circuit block diagram of a power system 100 according to an embodiment of the present disclosure.

The power system 100 may include a power controlling apparatus 1000 and a generator 1010, a battery unit 1020 and a brake unit 1030 electrically coupled to the power controlling apparatus 1000. The power controlling apparatus 1000 may convert energy generated by the generator 1010 to distribute the power on the battery unit 1020 and the brake unit 1030 in a balanced manner, so that the power system 100 may reach a steady state.

The power controlling apparatus 1000 may include an input end 110, an output end 120, a controlling unit 130, and a switching unit 140. In the embodiment, the input end 110 is used for receiving an input voltage signal Vin and an input current signal Iin corresponding to the energy provided by the generator 1010. The output end 120 is used for transmitting an output voltage signal Vo and an output current signal Io to the battery unit 1020. A battery voltage signal Vb of the battery unit 1020 is equal to the output voltage signal Vo.

The controlling unit 130 is electrically coupled to the input end 110 and the output end 120, and is used for generating a plurality of switching signals according to the input voltage signal Vin, the input current signal Iin, the output voltage signal Vo (which may also be referred to as the battery voltage signal Vb), and the output current signal Io. One of the switching signals (for example, a switching signal SW5) is used to turn on or turn off the brake unit 1030 coupled to the input end 110, so as to change the input current signal Iin received by the input end 110. That is to say, the switching signal SW5 may be used to turn on the brake unit 1030 for introducing in a portion of the current generated by the generator 1010, so as to decrease the current flowing into the input end 110.

The switching unit 140 is electrically coupled to the input end 110, the output end 120, and the controlling unit 130, and is controlled by at least one of the switching signals generated by the controlling unit 130 to adjust the output voltage signal Vo. For example, the controlling unit 130 may control a switching action of the switching unit 140 by adjusting a first pair of switching signals SW1, SW3 and a second pair of switching signals SW2, SW4, so as to decrease or increase the voltage Vb (that is, the output voltage signal Vo) of the battery unit 1020.

It should be noted that, the current signals Iin, Io and the voltage signals Vin, Vo may be processed digital signals which are directly transmitted to the controlling unit 130 for further computation processing, and may also be unprocessed analog signals which are transmitted to the controlling unit 130 and are converted into digital signals for further processing. That is to say, a person of ordinary skill in the art may select the forms of the current and voltage signals and their processing methods according to actual needs.

Figure 2:
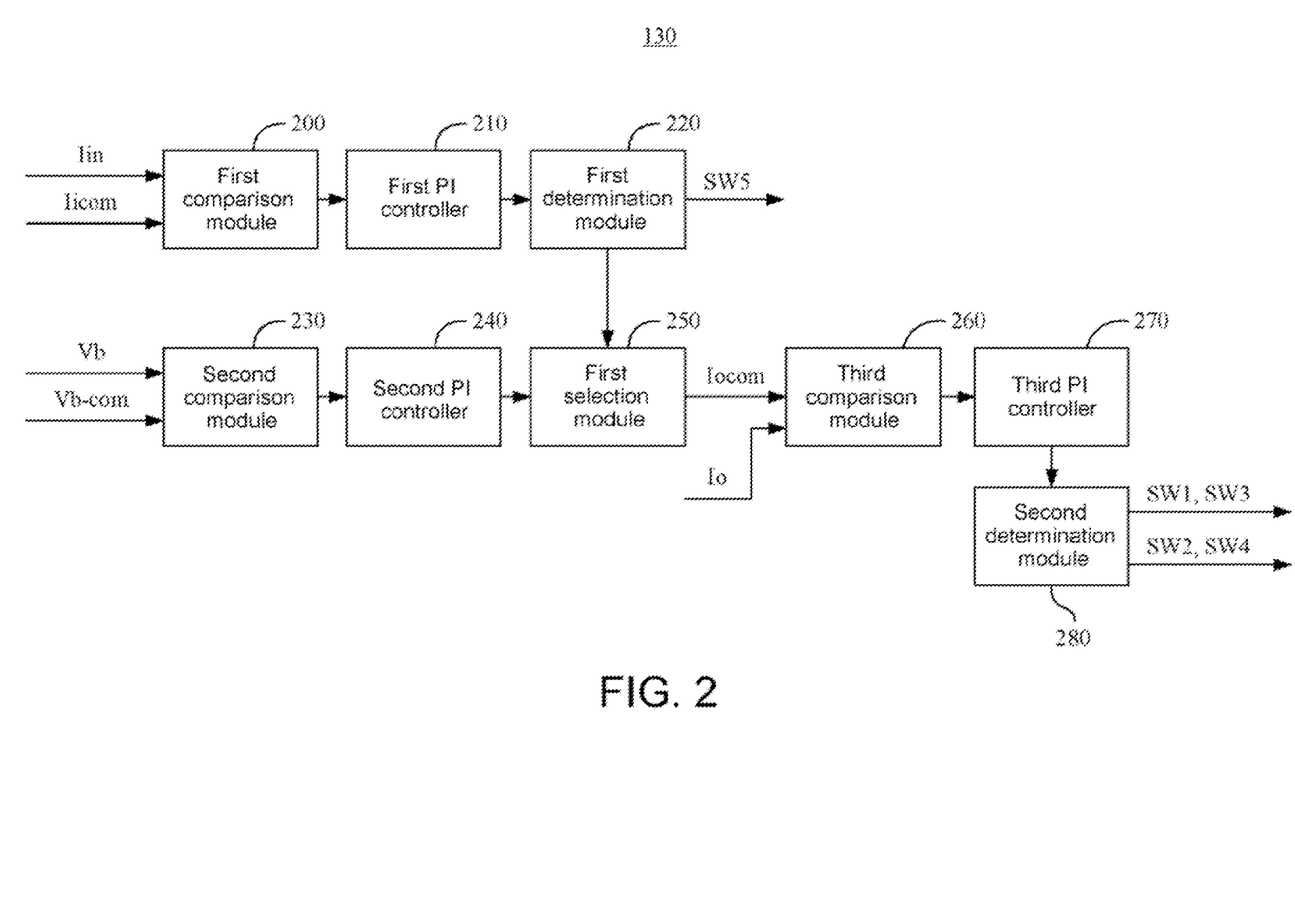
FIG. 2 is a schematic circuit block diagram of a controlling unit in FIG. 1 according to an embodiment of the present disclosure.

Referring to FIG. 1 and FIG. 2, FIG. 2 is a schematic circuit block diagram of the controlling unit 130 in FIG. 1 according to an embodiment of the present disclosure.

In an embodiment of the present disclosure, the controlling unit 130 may include a first comparison module 200 and a first PI controller 210. The first comparison module 200 is used for comparing the input current signal Iin with an input current command Iicom of a maximum power output corresponding to the input voltage signal Vin, so as to output a first difference. The first PI controller 210 is electrically coupled to the first comparison module 200, and is used for receiving the first difference and performing computation processing on the first difference by using a piecewise PI method (as shown in FIG. 8A to FIG. 10), so as to generate a first PI output. It should be noted that, the generator 1010 has a preset voltage-current curve (V-I curve) of the maximum power output. In an actual operation, the input current signal Iin and the input voltage signal Vin provided by the generator 1010 to the input end 110 may not be the maximum power output, and thus the controlling unit 130 may compare the input voltage signal Vin with the V-I curve of the maximum power output of the generator 1010, so as to obtain a current corresponding to the maximum power output, which is used as the corresponding input current command Iicom. Then, the controlling unit 130 may detect the input current signal Iin which is actually outputted to the input end 110 by the generator 1010, and perform a PI computation on the input current signal Iin and the input current command Iicom, and further perform feedback controlling on a rotational speed of the generator 1010, so as to enable the generator 1010 to reach the maximum power output.

In an embodiment of the present disclosure, the controlling unit 130 further includes a first determination module 220. The first determination module 220 is electrically coupled to the first PI controller 210, and is used for determining whether the input current signal Iin is greater than a maximum rated charging current of the battery unit 1020, so that the controlling unit 130 may generate a switching signal for controlling the brake unit 1030 according to a determination result of the first determination module 220. For example, when the input current signal Iin provided by the generator 1010 is greater than the maximum rated charging current of the battery unit 1020, the controlling unit 130 may generate the switching signal SW5 according to the determination result of the first determination module 220, so as to turn on the brake unit 1030 and introduce excess energy and current generated by the generator 1010 into the brake unit 1030. It should be noted that, the switching signal SW5 may be a pulse width modulated signal, and is used to control on-time of the brake unit 1030, so as to adjust the current flowing into the input end 110. Further, the feedback controlling may be performed on the rotational speed of the generator 1010 through the brake unit 1030, so as to balance the input current signal Iin with the output current signal Io.

In an embodiment of the present disclosure, the controlling unit 130 may further include a second comparison module 230 and a second PI controller 240. The second comparison module 230 is used for comparing the output voltage signal Vo with a voltage command (which may also be called a battery voltage command Vb-com) predetermined by the battery unit 1020, so as to output a second difference. The second PI controller 240 is electrically coupled to the second comparison module 230, and is used for receiving the second difference and performing computation processing on the second difference by using the piecewise PI method, so as to generate a second PI output.

In an embodiment of the present disclosure, the controlling unit 130 may further include a first selection module 250. The first selection module 250 is electrically coupled to the first determination module 220 and the second PI controller 240. The first selection module 250 selectively sets an output current command Iocom to be the first PI output or the second PI output according to a comparison result of the output voltage signal Vo and the battery voltage command Vb-com.

Figure 3:
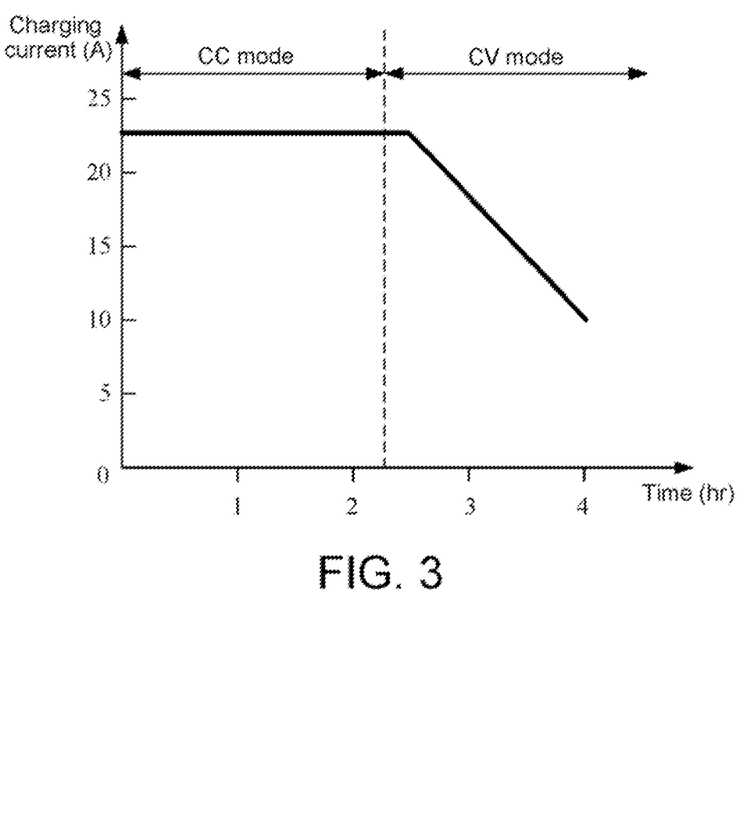
FIG. 3 is a schematic timing diagram showing a charging mode of a battery unit according to an embodiment of the present disclosure.

Referring to FIG. 1 to FIG. 3, FIG. 3 is a schematic timing diagram showing a charging mode of a battery unit according to an embodiment of the present disclosure.

Hereinafter, an embedment is used for explaining an operating method of the first selection module 250 and the relationship associated with the charging mode of the battery unit 1020. The controlling unit 130 may generate a corresponding PI outputted by comparing a difference between the actual battery voltage signal Vb (that is, the output voltage signal Vo) of the battery unit 1020 with a target voltage 58 V (that is, the battery voltage command Vb-com). At the beginning of charging the battery unit 1020, the voltage of the battery unit 1020 does not reach the target voltage 58 V, and thus a relatively big difference exists between the battery voltage signal Vb and the battery voltage command Vb-com, which may result in a large value of the second PI output computed by the second PI controller 240. Therefore, the first selection module 250 configures the output current command Iocom to be the first PI output, so as to restrict an upper limit of the output current command Iocom. In this way, the power controlling apparatus 1000 performs high current charging on the battery unit 1020 with a substantially constant output current signal Io (for example, 22 A), such as a Constant Current Mode (CC Mode) shown in FIG. 3.

When the battery unit 1020 is nearly fully charged, the voltage of the battery unit 1020 already reaches the target voltage 58 V, and thus a relatively small difference exists between the battery voltage signal Vb and the battery voltage command Vb-com, which may result in a small value of the second PI output computed by the second PI controller 240. Therefore, the first selection module 250 configures the output current command Iocom to be the second PI output, and in this way, the power controlling apparatus 1000 performs low current charging on the battery unit 1020 with a substantially constant output voltage signal Vo, such as a Constant Voltage Mode (CV Mode) shown in FIG. 3. Meanwhile, as the battery unit 1020 comes increasingly closer to being fully charged, the charging current decreases accordingly.

In an embodiment of the present disclosure, the controlling unit 130 may further include a third comparison module 260, a third PI controller 270, and a second determination module 280. The third comparison module 260 is used for comparing the output current signal Io with the output current command Iocom, so as to output a third difference. The third PI controller 270 is electrically coupled to the third comparison module 260, and is used for receiving the third difference and performing computation processing on the third difference by using the piecewise PI method, so as to generate a third PI output. The second determination module 280 is electrically coupled to the third PI controller 270, and decides according to the third PI output that the controlling unit 130 outputs the first pair of switching signals SW1, SW3 and the second pair of switching signals SW2, SW4 among the switching signals. The controlling unit 130 adjusts the first pair of switching signals SW1, SW3 and the second pair of switching signals SW2, SW4 according to the third PI output, so as to enable the switching unit 140 to perform a corresponding switching action, thereby adjusting the output voltage signal Vo.

For example, the controlling unit 130 may adjust a pulse width of the first pair of switching signals SW1, SW3 and the second pair of switching signals SW2, SW4 according to the third PI output generated from a comparison result of the output current command Iocom and the output current signal Io, so as to control on-time of a plurality of corresponding switches in the switching unit 140 for adjusting the output voltage signal Vo, thereby decreasing or increasing the voltage of the battery unit 1020.

In addition, the controlling unit 130 may further output a switching signal SW6 to control whether to connect the output end 120 to a load unit 1040.

It should be noted that, the comparison modules, the PI controllers, the determination modules, and the selection modules in the controlling unit 130 may be implemented by software, hardware, or a combination of software and hardware, and the present disclosure is not limited thereto.

Figure 4:
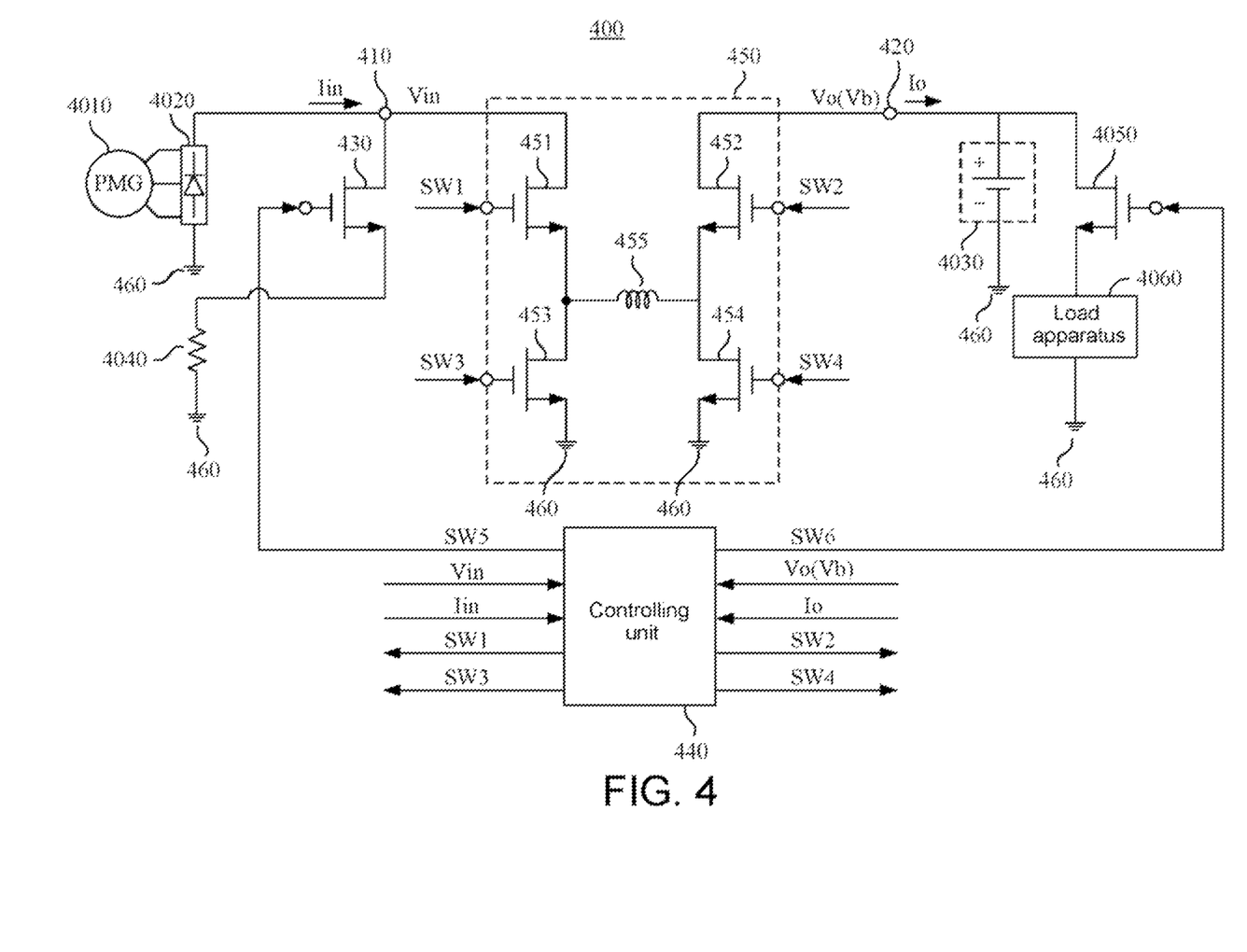
FIG. 4 is a schematic circuit block diagram of a power system according to an embodiment of the present disclosure.

Referring to FIG. 4, FIG. 4 is a schematic circuit block diagram of a power system 400 according to an embodiment of the present disclosure. The power system 400 may include a power input end 410, a power output end 420, a brake switch 430, a controlling unit 440, and a switching unit 450.

The power input end 410 is used for receiving an input voltage signal Vin and an input current signal Iin corresponding to energy provided by a generator 4010. Further, a rectifier unit 4020 may be disposed between the generator 4010 and the power input end 410, and is used for rectifying and filtering a three-phrase Alternating Current (AC) signal outputted by the generator 4010 and providing the three-phrase AC signal to the power input end 410. The power output end 420 is used for transmitting an output voltage signal Vo and an output current signal Io to a battery unit 4030.

The brake switch 430 is electrically coupled to the power input end 410, and is used for adjusting the input current signal Iin. The controlling unit 440 is electrically coupled to the power input end 410 and the power output end 420, and is used for generating a plurality of switching signals according to the input voltage signal Vin, the input current signal Iin, the output voltage signal Vo (which may also be referred to as a battery voltage signal Vb), and the output current signal Io. One of the switching signals is used to turn on or turn off the brake switch 430, so as to change the input current signal Iin received by the power input end 410. For example, when a rotational speed of the generator 4010 is so high that excessive energy and current are generated, the controlling unit 440 may generate a switching signal SW5 to turn on the brake switch 430, so as to introduce excess energy and current generated by the generator 4010 into a brake resistor 4040. Further, with the brake resistor 4040, the rotational speed of the generator 4010 may be adjusted through a feedback controlling method, so as to balance the input current signal Iin with the output current signal Io.

The switching unit 450 is electrically coupled to the power input end 410, the power output end 420, and the controlling unit 440, and is controlled by at least one of the switching signals generated by the controlling unit 440 to adjust the output voltage signal Vo. For example, the controlling unit 440 may control switching actions of a plurality of switches (for example, from a first switch 451 to a fourth switch 454) in the switching unit 450 by adjusting the first pair of switching signals SW1, SW3 and the second pair of switching signals SW2, SW4, so as to decrease or increase the battery voltage signal Vb (that is, the output voltage signal Vo) of the battery unit 4030.

In an embodiment of the present disclosure, the controlling unit 440 performs comparison and a piecewise PI computation (as shown in FIG. 8A to FIG. 10) on the input voltage signal Vin, the input current signal Iin, the output voltage signal Vo, the output current signal Io, the battery voltage command Vb-com, and the current command, so as to output a switching signal. For example, the controlling unit 440 may receive the input voltage signal Vin, the input current signal Iin, the output voltage signal Vo, and the output current signal Io which are processed by analog to digital conversion, and then compare the input voltage signal Vin, the input current signal Iin, the output voltage signal Vo, and the output current signal Io with the corresponding voltage and current commands and perform a PI computation thereon, so as to output the switching signal SW5 for controlling the brake switch 430 and the switching signals SW1 to SW4 for controlling the switching unit 450.

In an embodiment of the present disclosure, the switching unit 450 may include the first switch 451, the second switch 452, the third switch 453, the fourth switch 454, and an inductor 455. The first switch 451 is electrically coupled to the controlling unit 440 and the power input end 410. The second switch 452 is electrically coupled to the controlling unit 440 and the power output end 420. The third switch 453 is electrically coupled to the controlling unit 440, the first switch 451, and a grounding end 460. The fourth switch 454 is electrically coupled to the controlling unit 440, the second switch 452, and the grounding end 460. The inductor 455 is electrically coupled between the first switch 451, the second switch 452, the third switch 453, and the fourth switch 454. The first switch 451, the second switch 452, the third switch 453, the fourth switch 454, and the inductor 455 form an H-shaped electrical bridge.

Figure 5:
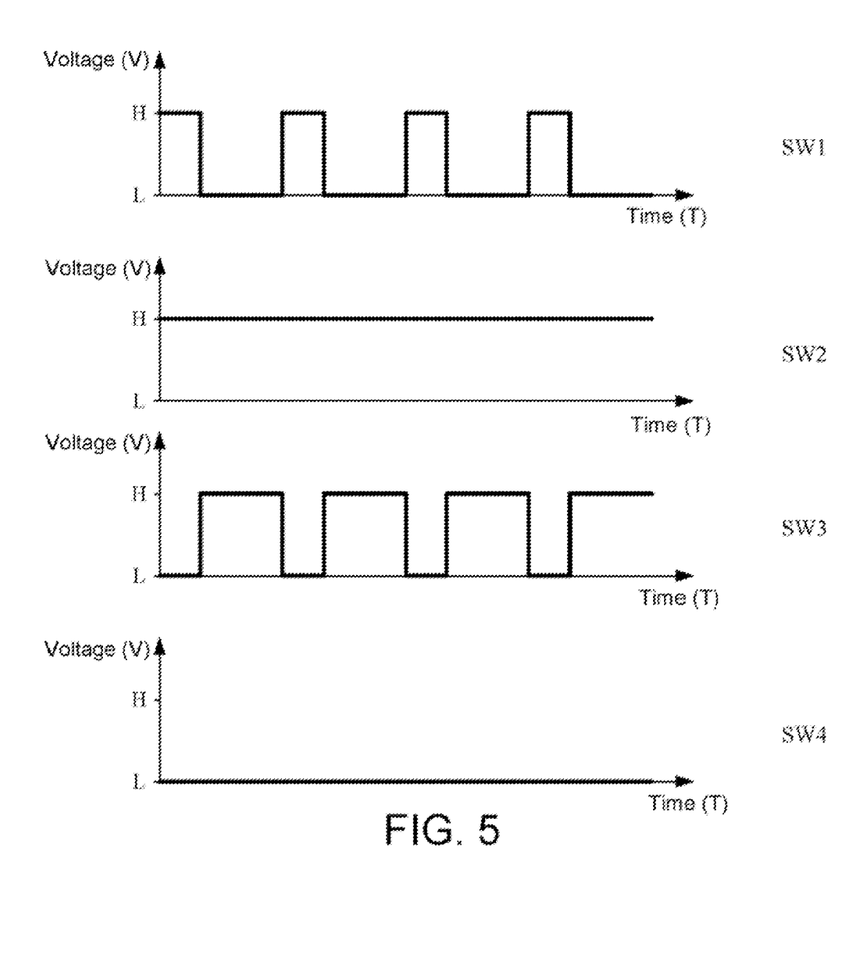
FIG. 5 is a schematic timing control diagram showing a buck mode of a power system according to an embodiment of the present disclosure.

Referring to FIG. 4 and FIG. 5, FIG. 5 is a schematic timing control diagram showing a buck mode of a power system according to an embodiment of the present disclosure.

In an embodiment of the present disclosure, the controlling unit 440 controls on-time of the first switch 451 and the third switch 453 through the first pair of switching signals SW1, SW3 among the switching signals, so as to decrease the output voltage signal Vo (that is, to decrease the battery voltage signal Vb of the battery unit 4030) through the H-shaped electrical bridge.

In an embodiment of the present disclosure, the first pair of switching signals SW1, SW3 are complementary pulse width modulated signals. That is to say, the switching signal SW1 and the switching signal SW3 are complementary to each other.

Figure 6:
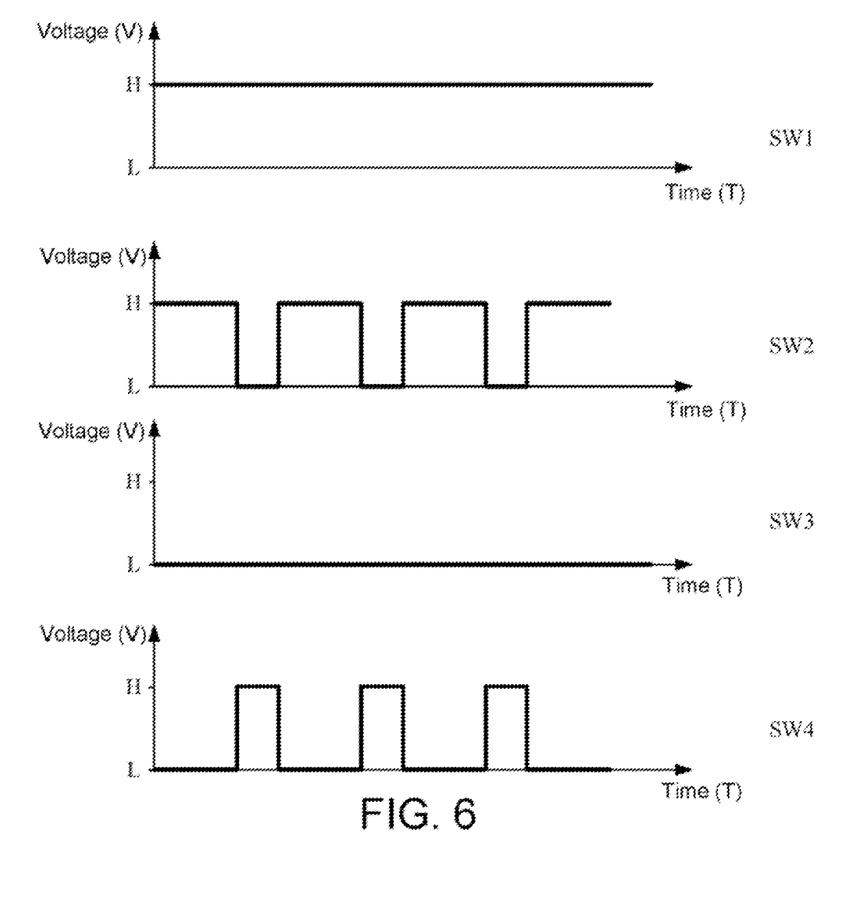
FIG. 6 is a schematic timing control diagram showing a boost mode of a power system according to an embodiment of the present disclosure.

Referring to FIG. 4 and FIG. 6, FIG. 6 is a schematic timing control diagram of a boost mode of a power system according to an embodiment of the present disclosure.

In an embodiment of the present disclosure, the controlling unit 440 controls on-time of the second switch 452 and the fourth switch 454 through the second pair of switching signals SW2, SW4 among the switching signals, so as to increase the output voltage signal Vo (that is, to increase the battery voltage signal Vb of the battery unit 4030) through the H-shaped electrical bridge.

In an embodiment of the present disclosure, the second pair of switching signals SW2, SW4 are complementary pulse width modulated signals. That is to say, the switching signal SW2 and the switching signal SW4 are complementary to each other.

It should be noted that, signal types of the switching signal SW1 to the switching signal SW4 may be changed according to requirements of an actual operation, and the present disclosure is not limited thereto.

In an embodiment of the present disclosure, the controlling unit 440 may further output another one of the switching signals, so as to turn on or turn off a to load switch 4050 coupled to the power output end 420. For example, the controlling unit 440 may output a switching signal SW6, so as to turn on or turn off the load switch 4050. When the load switch 4050 is turned on, the power output end 420 is coupled to a load apparatus 4060. When the load switch 4050 is turned off, the power output end 420 is isolated from the load apparatus 4060. Therefore, in the power system 400, the switching signal SW6 may be controlled to decide whether to connect the power output end 420 to the load apparatus 4060.

Referring to FIG. 1 to FIG. 7, FIG. 7 is a flow chart showing a power controlling method according to an embodiment of the present disclosure. The power controlling method may be applied on the power system 100 shown in FIG. 1, and the step process of the following embodiment is used for explanation. In Step 710, the controlling unit 130 obtains an input voltage signal Vin and an input current signal Iin corresponding to energy provided by the generator 1010. In Step 715, the controlling unit 130 performs a first PI computation according to the input current signal Iin and an input current command Iicom of a maximum power output corresponding to the input voltage signal Vin.

Figure 7:
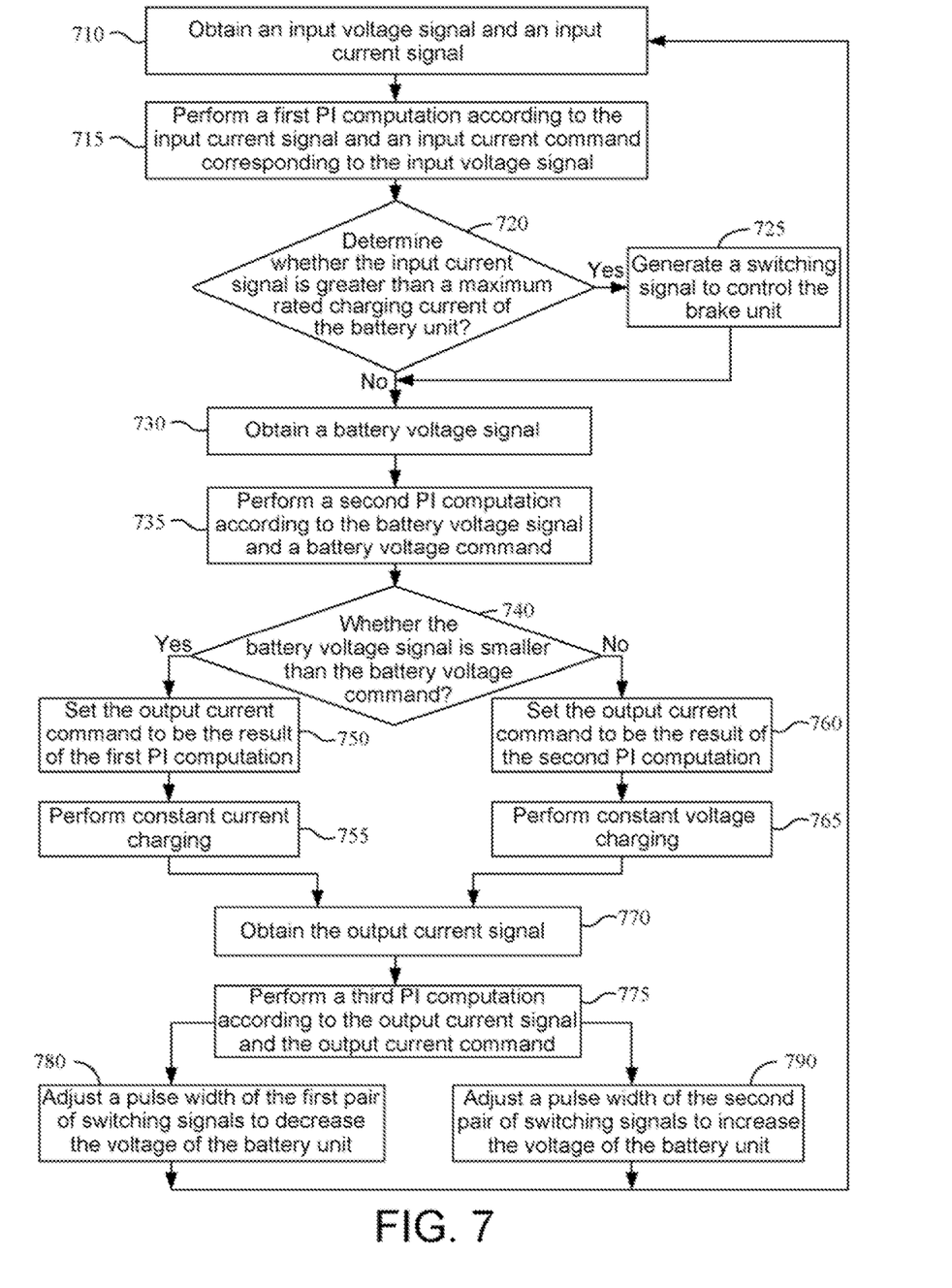
FIG. 7 is a flow chart showing a power controlling method according to an embodiment of the present disclosure.

In Step 715, further, comparison is made between the input current signal Iin and the input current command Iicom of the maximum power output corresponding to the input voltage signal Vin, to output a first difference, and computation processing is performed on the first difference by using the piecewise PI method (as shown in FIG. 8A to FIG. 10), to generate a first PI output.

In Step 720, the controlling unit 130 determines whether the input current signal Iin is greater than a maximum rated charging current of the battery unit 1020. In Step 725, if the input current signal Iin is greater than the maximum rated charging current of the battery unit 1020, the controlling unit 130 generates a switching signal (for example, a switching signal SW5) for controlling the brake unit 1030, so as to decrease the input current signal Iin.

In Step 730, the controlling unit 130 obtains an output voltage signal Vo (that is, a battery voltage signal Vb of the battery unit 1020) of the output end 120. In Step 735, the controlling unit 130 performs a second PI computation according to the output voltage signal Vo and a battery voltage command Vb-com predetermined by the battery unit 1020.

In Step 735, further, the output voltage signal Vo and the battery voltage command Vb-com predetermined by the battery unit 1020 are compared to output a second difference, and computation processing is performed on the second difference by using the piecewise PI method, so as to generate a second PI output.

In Step 740, the controlling unit 130 compares the output voltage signal Vo with the battery voltage command Vb-com, so that the controlling unit 130 may selectively set the output current command Iocom to be a result of the first PI computation or a result of the second PI computation according to a comparison result of the output voltage signal Vo and the battery voltage command Vb-com. For example, when the output voltage signal Vo is smaller than the battery voltage command Vb-com, the output current command Iocom is set to be the result of the first PI computation, as shown in Step 750, so that the battery unit 1020 is charged by using a substantially constant output current signal Io, that is, constant current charging is performed on the battery unit 1020, as shown in Step 755. When the output voltage signal Vo is equal to the battery voltage command Vb-com, the output current command Iocom is set to be the result of the second PI computation, as shown in Step 760, so that the battery unit 1020 is charged by using a substantially constant output voltage signal Vo, that is, constant voltage charging is performed on the battery unit 1020, as shown in Step 765.

Then in Step 770, the controlling unit 130 obtains the output current signal Io of the output end 120. It should be noted that, if the output end 120 is not connected to the load unit 1040, the output current signal Io is a charging current of the battery unit 1020. If the output end 120 is connected to the load unit 1040, the output current signal Io is a sum of the charging current of the battery unit 1020 and a current of the load unit 1040. In Step 775, the controlling unit 130 performs a third PI computation according to the output current signal Io and the output current command Iocom, and the third PI computation includes comparing the output current signal Io with the output current command Iocom to output a third difference, and using the piecewise PI method to perform computation processing on the third difference to generate a third PI output, so that the controlling unit 130 may adjust a first pair of switching signals SW1, SW3 and a second pair of switching signals SW2, SW4 according to a result of the third PI computation, thereby enabling the switching unit 140 to perform a corresponding switching action to adjust the output voltage signal Vo (that is, the battery voltage signal Vb). The operating principle and process of the power controlling method in the embodiment are the same as or similar to those of the power systems shown in FIG. 1 and FIG. 4, and thus are not described again herein.

In an embodiment of the present disclosure, the controlling unit 130 may adjust a pulse width of the first pair of switching signals SW1, SW3, as shown in FIG. 5, to control the switching unit 140 to perform a corresponding switching action to enter a buck mode, so as to decrease the voltage of the battery unit 1020 (that is, to decrease the output voltage signal Vo), as shown in Step 780. In addition, the controlling unit 130 may also adjust a pulse width of the second pair of switching signals SW2, SW4, as shown in FIG. 6, to control the switching unit 140 to perform a corresponding switching action to enter a boost mode, so as to increase the voltage of the battery unit 1020 (that is, to increase the output voltage signal Vo), as shown in Step 790.

It should be noted that, the first pair of switching signals SW1, SW3 and the second pair of switching signals SW2, SW4 may be complementary pulse width modulated signals. That is to say, the switching signal SW1 and the switching signal SW3 are complementary to each other, and the switching signal SW2 and the switching signal SW4 are complementary to each other. In addition, signal types of the switching signal SW1 to the switching signal SW4 may be changed according to requirements of an actual operation, and the present disclosure is not limited thereto.

In addition, the power controlling method may further include outputting another one of the switching signals (for example, a switching signal SW6) to control the load unit 1040 to be turned on or turned off. When the load unit 1040 is turned on, the load unit 1040 is coupled to the output end 120. When the load unit 1040 is turned off, the load unit 1040 is isolated from the output end 120. Therefore, the switching signal SW6 of the controlling unit 130 is controlled to decide whether to connect the output end 120 to the load unit 1040.

Figure 9A:
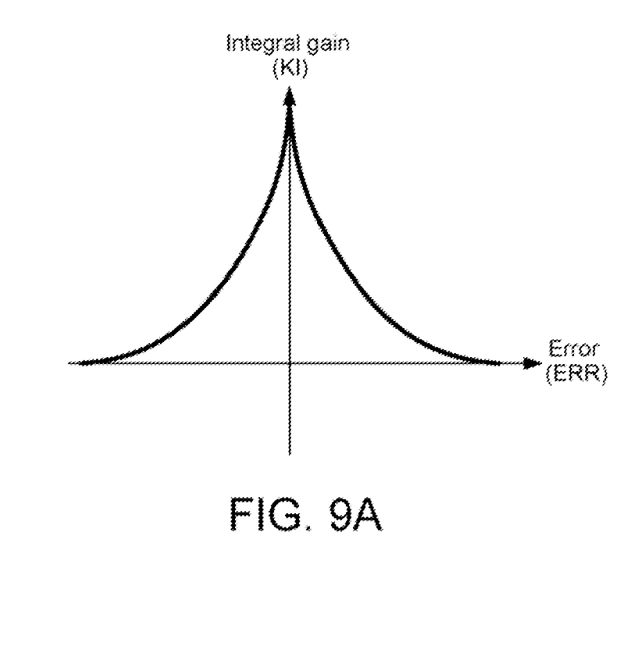
FIG. 9A is a schematic diagram showing an integral gain function of a PI method according to an embodiment of the present disclosure.
Figure 9B:
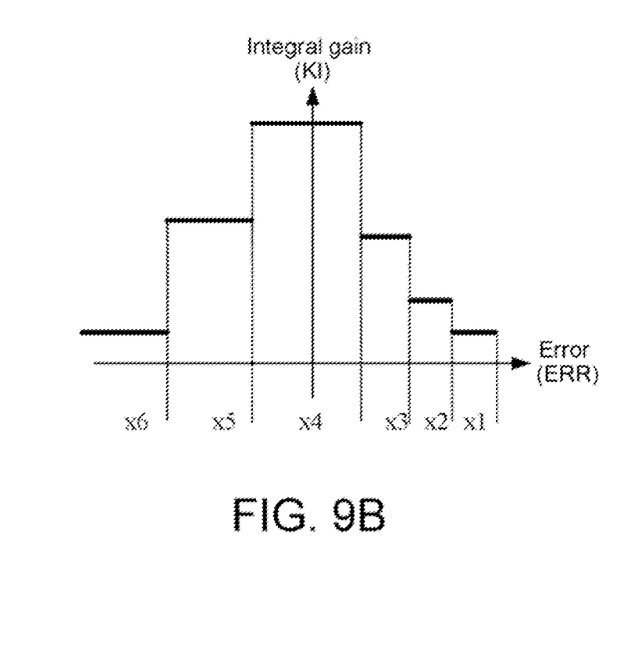
FIG. 9B is a schematic diagram showing a piecewise integral gain function of a PI method according to an embodiment of the present disclosure.
Figure 10:
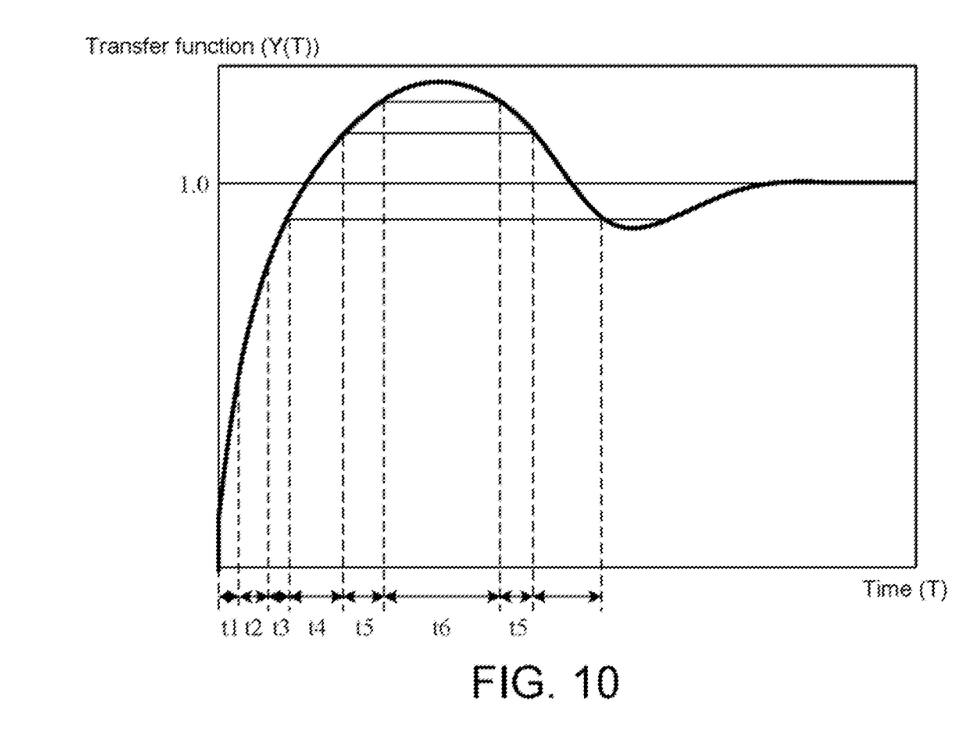
FIG. 10 is a schematic timing control diagram showing outputs of a transfer function using a PI method according to an embodiment of the present disclosure.

The operating principles of the piecewise PI method are illustrated below by using an embodiment. Referring to FIG. 8A to FIG. 10, FIG. 8A and FIG. 8B are schematic diagrams showing an error gain function and a piecewise error gain function of a PI method according to an embodiment of the present disclosure respectively; FIG. 9A and FIG. 9B are schematic diagrams of showing integral gain function and a piecewise integral gain function of a PI method according to an embodiment of the present disclosure respectively; and FIG. 10 is a schematic timing control diagram showing outputs of a transfer function using a PI method according to an embodiment of the present disclosure.

Figure 8A:
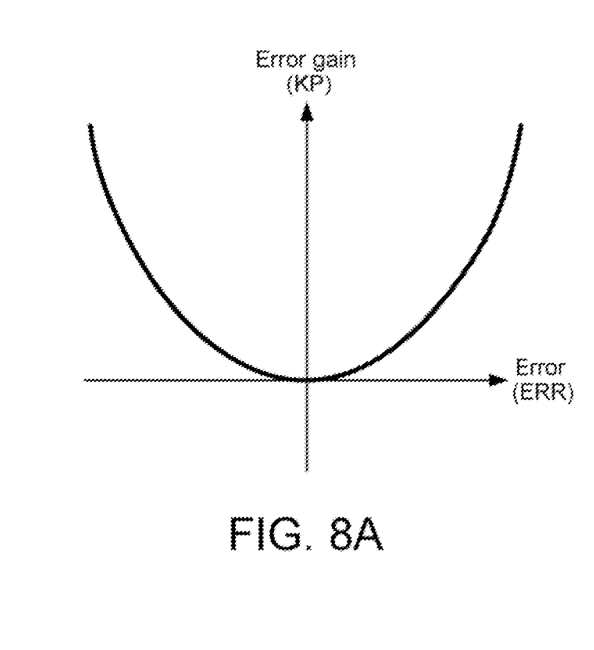
FIG. 8A is a schematic diagram showing an error gain function of a PI method according to an embodiment of the present disclosure.
Figure 8B:
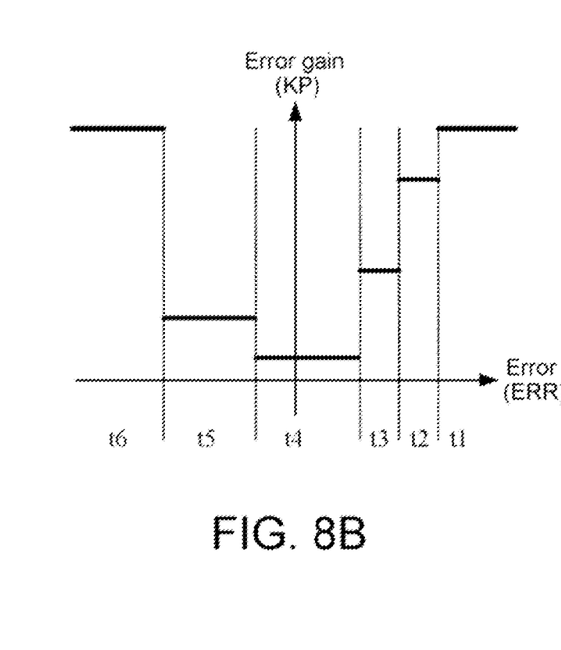
FIG. 8B is a schematic diagram showing an error gain function of a PI method according to an embodiment of the present disclosure.

In an embodiment of the present disclosure, in the first PI computation, the second PI computation, and the third PI computation, the error gain function shown in FIG. 8A is divided into a plurality of sections t1 to t6, such as the piecewise error gain function shown in FIG. 8B. Meanwhile, the integral gain function shown in FIG. 9A may be divided into multiple sections x1 to x6, such as the piecewise integral gain function shown in FIG. 9B. Therefore, the controlling unit 130 may decide which section is to be operated on according to an energy adjustment situation of the generator 1010, the battery unit 1020, and the brake unit 1030, so as to rapidly determine values of the error gain and the integral gain, and then generate multiple switching signals according to the values of the error gain and the integral gain to control switching actions of corresponding switches, thereby distributing the energy and current among the generator 1010, the battery unit 1020, and the brake unit 1030 in a balanced manner. It can be known from the figures and examples that, the controlling unit 130 operated by using the piecewise PI method can perform the PI computation with smaller error and integral gains to shorten the computation processing time, so that the generator 1010, the battery unit 1020, and the brake unit 1030 can rapidly reach a steady state in which the output of the transfer function is 1, as shown in FIG. 10.

When compared with the prior art, in the embodiments of the present disclosure, the power controlling method of non-linear PI controlling is employed, and the digital pulse modulated signal is used to control the on-time of the corresponding switches, so as to distribute the energy generated by the wind turbine to the battery unit and the brake unit in a balanced manner. In addition, the error gain function and the integral gain function are simplified into multiple sections to speed up convergence of the output of the transfer function, so as to enable a steady state of the energy, voltage, and current to be reached rapidly between the wind turbine, the battery unit, and the brake unit.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A power controlling apparatus, comprising:
   an input end for receiving an input voltage signal and an input current signal corresponding to energy provided by a generator;
   an output end for transmitting an output voltage signal and an output current signal to a battery unit;
   a controlling unit which is electrically coupled to the input end and the output end, and is used for generating a first switching signal according to the input voltage signal and the input current signal, and generating a plurality of second switching signals according to the input voltage signal, the input current signal, the output voltage signal, and the output current signal, wherein the first switching signal is used to turn on or turn off a brake unit coupled to the input end, so as to change the input current signal received by the input end, wherein the controlling unit comprises a first determination module which is configured for determining whether the input current signal is greater than a maximum rated charging current of the battery unit to obtain a determination result, and the controlling unit generated the first switching signal for controlling the brake unit according to the determination result; and
   a switching unit which is electrically coupled to the input end, the output end, and the controlling unit, and is controlled by at least one of the second switching signals generated by the controlling unit to adjust the output voltage signal.

2. The power controlling apparatus of claim 1, wherein the controlling unit comprises:
   a first comparison module for comparing the input current signal with an input current command of a maximum power output corresponding to the input voltage signal, so as to output a first difference; and
   a first Proportional Integral (PI) controller which is electrically coupled to the first comparison module, and is used for receiving the first difference and performing computation processing on the first difference by using a piecewise PI method, so as to generate a first PI output.

3. The power controlling apparatus of claim 2, wherein the controlling unit further comprises:
   a second comparison module for comparing the output voltage signal with a voltage command predetermined by the battery unit to obtain a comparison result, so as to output a second difference; and
   a second PI controller which is electrically coupled to the second comparison module, and is used for receiving the second difference and performing computation processing on the second difference by using a piecewise PI method, so as to generate a second PI output.

4. The power controlling apparatus of claim 3, wherein the controlling unit further comprises:
   a first selection module which is electrically coupled to the first determination module and the second PI controller, wherein the first selection module selectively sets an output current command to be the first PI output or the second PI output according to the comparison result.

5. The power controlling apparatus of claim 4, wherein the controlling unit further comprise:
   a third comparison module for comparing the output current signal with the output current command, so as to output a third difference;
   a third PI controller which is electrically coupled to the third comparison module, and is used for receiving the third difference and performing computation processing on the third difference by using a piecewise PI method, so as to generate a third PI output; and
   a second determination module which is electrically coupled to the third PI controller, and is used for deciding according to the third PI output that the controlling unit outputs a first pair of switching signals and a second pair of switching signals among the second switching signals, wherein the controlling unit adjusts the first pair of switching signals and the second pair of switching signals according to the third PI output, thereby enabling the switching unit to perform a corresponding switching action, so as to adjust the output voltage signal.

6. The power controlling apparatus of claim 4, wherein when the first selection module sets the output current command to be the first PI output, and the power controlling apparatus charges the battery unit with the output current signal which is substantially constant; and when the first selection module sets the output current command to be the second PI output, the power controlling apparatus charges the battery unit with the output voltage signal which is substantially constant.

7. A power system, comprising:
   a power input end for receiving an input voltage signal and an input current signal corresponding to energy provided by a generator;
   a power output end for transmitting an output voltage signal and an output current signal to a battery unit;
   a brake switch which is electrically coupled to the power input end, and is used for adjusting the input current signal;
   a controlling unit which is electrically coupled to the power input end and the power output end, and is used for generating a first switching signal according to the input voltage signal and the input current signal, and generating a plurality of second switching signals according to the input voltage signal, the input current signal, the output voltage signal, and the output current signal, wherein the first switching signal is used to turn on or turn off the brake unit, so as to change the input current signal received by the power input end, wherein the controlling unit comprises a first determination module which is used for determining whether the input current signal is greater than a maximum rated charging current of the battery unit to obtain a determination result, and the controlling unit generated the first switching signal for controlling the brake unit according to the determination result; and a switching unit which is electrically coupled to the power input end, the power output end, and the controlling unit, and is controlled by at least one of the second switching signals generated by the controlling unit to adjust the output voltage signal.

8. The power system of claim 7, wherein the controlling unit performs comparison and a piecewise Proportional Integral (PI) computation on the input voltage signal, the input current signal, the output voltage signal, the output current signal, a voltage command, and a current command, so as to output the first switching signal and the second switching signals.

9. The power system of claim 7, wherein the switching unit comprises:
a first switch electrically coupled to the controlling unit and the power input end;
a second switch electrically coupled to the controlling unit and the power output end;
a third switch electrically coupled to the controlling unit, the first switch, and a grounding end;
a fourth switch electrically coupled to the controlling unit, the second switch, and the grounding end; and
an inductor electrically coupled between the first switch, the second switch, the third switch, and the fourth switch, wherein the first switch, the second switch, the third switch, the fourth switch, and the inductor form an H-shaped electrical bridge.

10. The power system of claim 9, wherein the controlling unit controls on-time of the first switch and the third switch through a first pair of switching signals among the second switching signals, so as to decrease the output voltage signal.

11. The power system of claim 10, wherein the first pair of switching signals are complementary pulse width modulated signals.

12. The power system of claim 9, wherein the controlling unit controls on-time of the second switch and the fourth switch through a second pair of switching signals among the second switching signals, so as to increase the output voltage signal.

13. The power system of claim 12, wherein the second pair of switching signals are complementary pulse width modulated signals.

14. The power system of claim 7, wherein the controlling unit further outputs a third switching signal to turn on or turn off a load switch coupled to the power output end.

15. A power controlling method, comprising:
performing a first Proportional Integral (PI) computation according to an input current signal and an input current command of a maximum power output corresponding to an input voltage signal, wherein the input current signal and the input voltage signal are corresponding to energy provided by a generator;
determining whether the input current signal is greater than a maximum rated charging current of a battery unit;
generating a first switching signal for controlling a brake unit when the input current signal is greater than the maximum rated charging current of the battery unit;
performing a second PI computation according to an output voltage signal and a voltage command and predetermined by the battery unit;
comparing the output voltage signal with the voltage command;
selectively setting an output current command to be a result of the first PI computation or a result of the second PI computation according to a comparison result of the output voltage signal and the voltage command;
performing a third PI computation according to an output current signal and the output current command;
generating a plurality of second switching signals; and
adjusting a first pair of switching signals and a second pair of switching signals among the second switching signals according to a result of the third PI computation, thereby enabling a switching unit to perform a corresponding switching action, so as to adjust the output voltage signal.

16. The power controlling method of claim 15, wherein, in the first PI computation, the second PI computation, and the third PI computation, each of an error gain function and an integral gain function is divided into a plurality of sections, and a controlling unit performs computation processing on gain values corresponding to the sections, and shortens computation processing time by operating with a piecewise PI method.

17. The power controlling method of claim 16, wherein the step of performing the first PI computation further comprises:
comparing the input current signal with the input current command of the maximum power output corresponding to the input voltage signal, so as to output a first difference; and
performing computation processing on the first difference by using the piecewise PI method, so as to generate a first PI output.

18. The power controlling method of claim 16, wherein the step of performing the second PI computation further comprises:
comparing the output voltage signal with the voltage command predetermined by the battery unit, so as to output a second difference; and
performing computation processing on the second difference by using the piecewise PI method, so as to generate a second PI output.

19. The power controlling method of claim 16, wherein the step of performing the third PI computation further comprises:
comparing the output current signal with the output current command, so as to output a third difference; and
performing computation processing on the third difference by using the piecewise PI method, so as to generate a third PI output.

20. The power controlling method of claim 15, wherein when the output voltage signal is smaller than the voltage command, the output current command is set to be the result of the first PI computation thereby enabling the battery unit to be charged with the output current signal which is substantially constant; and when the output voltage signal is equal to the voltage command, the output current command is set to be the result of the second PI computation thereby enabling the battery unit to be charged with the output voltage signal which is substantially constant.

21. The power controlling method of claim 15, wherein the first pair of switching signals are complementary pulse width modulated signals, and the second pair of switching signals are complementary pulse width modulated signals.

22. The power controlling method of claim 15, further comprising:
outputting a third switching signal to control a load unit to be turned on or turned off.

* * * * *